Patented Oct. 2, 1934

1,975,257

UNITED STATES PATENT OFFICE 1,975,257

PYRANTHRONE-HALOGEN COMPLEX ADDITION COMPOUND AND PROCESS OF MAKING THE SAME

Joseph Deinet, Milwaukee, and David Katz, South Milwaukee, Wis., assignors to E. I. du Pont de Nemours & Company, Wilmington, Del., a corporation of Delaware No Drawing. Application October 15, 1932, Serial No. 637,986

24 Claims. (Cl. 260—61)

This invention relates to novel organic compounds of the pyranthrone series and to a process of preparing the same. More particularly, this invention deals with novel halogen-pyranthrone addition-compounds which are useful for the preparation of novel halogenated pyranthrones.

In copending application Ser. No. 637,985, by one of us, is disclosed a new series of halogenated pyranthrones which are distinguished from the isomeric known pyranthrones by the fact that when condensed with alpha-amino-anthraquinone, they give vat dyes which dye cotton in khaki to olive green to dark green shades. As disclosed in said copending application, it has been found a requisite condition in the process of preparing said novel halogenated pyranthrone to conduct the reaction so as to lead first to the preparation of an intermediate complex body involving pyranthrone and halogen. This intermediate complex body, when decomposed by the aid of anhydrous oxidizing or halogenating agents, leads to novel halogen-pyranthrones.

The present invention concerns itself mainly with these pyranthrone-halogen complex bodies, and with the process of preparing them.

It is an object of this invention to produce novel pyranthrone-halogen addition-compounds which are useful for the preparation of halogenated pyranthrones.

It is a further object of our invention to provide a process for preparing these novel pyranthrone-halogen addition-compounds.

Other and further important objects of this invention will appear as the description proceeds.

We have found that if pyranthrone is reacted upon with halogenating agents in the presence of certain catalyzers, as more fully set forth below, novel halogen addition compounds of pyranthrone are produced which have the property of yielding novel and useful halogen-pyranthrone compounds when reacted upon with anhydrous oxidizing or halogenating agents. The requisite catalyzers mentioned above are anhydrous, mild reducing agents, or substances capable of developing such reducing agents by reacting with certain components of the reaction mixture. The latter class comprises organic substances which are readily susceptible to halogenation in anhydrous medium by means of bromine or sulfuryl chloride. In doing so, these substances liberate hydrobromic acid or sulfur dioxide, respectively, which constitute the mild reducing agents above noted.

The simplest and most active representatives of this novel series of catalyzers are the arylamines, typified by aniline. As is well known, arylamines are highly reactive toward halogen. In any event, they are more reactive toward halogen than pyranthrone. It seems that when suspended or dissolved in an inert organic liquid in the presence of pyranthrone and a halogenating agent such as sulfuryl chloride or bromine, the arylamine is attacked first and becomes highly halogenated. In doing so, sulfur dioxide or hydrobromic acid (as the case may be) is liberated in nascent state. It appears that this nascent reducing agent catalyzes the reaction between the pyranthrone and the halogenating agent. Or again, this reducing agent may function merely to establish equilibrium between an intermediate complex pyranthrone-halogen addition-compound and its decomposition products. In any event, the pyranthrone is quickly converted into a black suspension mass which is insoluble in nitrobenzene. When viewed under the microscope it presents the form of dark violet needles having a green fluorescence.

This pyranthrone-halogen body is fairly stable at ordinary temperatures when maintained in its own reaction mass. Moisture, heat or contact with air, however, decompose it rapidly into pyranthrone and halogen. Alcohol or acetic acid have a similar effect. Anhydrous oxidizing agents, such as strong chlorinating agents, decompose it into novel halogenated pyranthrones, probably isomeric with, but nevertheless distinct from known halogen-pyranthrones, as more fully discussed below.

The constitution of this novel body is not known with certainty. From its mode of formation and behavior we would judge that it is a complex addition-compound of pyranthrone and the particular halogenating agent used, such as sulfuryl chloride, bromine, sulfur monobromide or hydrobromic acid. But it does seem to be well established that the additive molecules enter in pairs; that is, two molecules of halogenating agent to each molecule of pyranthrone. It also seems fairly certain that the entering molecules take a certain definite position in the pyranthrone structure, very likely in the meso carbon atoms. This assumption seems to explain the fact that when the addition-compound is treated with an anhydrous oxidizing agent or a different and stronger halogenating agent than the one from which it was formed, it decomposes and yields a novel mono-, di-, or tri-halogen pyranthrone (depending on the particular halogenating agent used), differing in properties from known halogen-pyranthrones of the corresponding halogen content. This difference in properties is best shown up by the shade of the vat dyestuff obtained when one of these novel halogen-pyranthrones is condensed with alpha-amino-anthraquinone, as more fully set forth in copending application by one of us, Ser. No. 637,987.

It will be understood from the preceding that our designation of these novel intermediates as "pyranthrone-halogen addition-compounds" is merely a shorthand way of naming the compound obtained by reacting upon pyranthrone with a halogenating agent in the presence of a mild reducing agent or in the presence of an organic substance readily susceptible to halogenation. Similarly, the designation of said last mentioned substances as "catalyzers" is merely a convenient way of designating these compounds, and should not be construed as limiting this invention to any special theory of operation.

As such catalyzers, the following substances were found successful:

Inorganic compounds: sulfur dioxide gas, hydrobromic acid, sulfur monobromide.

Arylamines: aniline, o-, m-, and p-toluidine, alpha- and beta-naphthylamine, diphenyl-amine.

Phenols: phenol, cresol, hexalin, alpha-naphthol.

Hydrocarbons: solvent naphtha, toluene.

Aliphatic compounds: acetone.

Salts of the arylamines and of the phenols above mentioned.

Mixtures of any two or more of the above catalyzers.

It seems that all that is necessary of a particular organic substance to be suitable as a catalyzer for the above purpose is that it be more readily halogenable with the particular halogen selected than pyranthrone, and that it be soluble in the particular suspending medium selected.

The quantity of catalyst required for the above purpose is very small. Indeed, it has been observed that where recovered nitrobenzene is employed as a solvent, the trace of aniline present therein as an impurity is sufficient to exert the requisite catalytic effect. For this reason and in view of its low cost, recovered nitrobenzene makes an excellent suspending medium for the above reaction, and requires no added catalyzer whatever.

Other solvents or suspended media may be employed, if desired, the limitations being first that it be anhydrous or capable of being dehydrated before use, and secondly that it be difficult of halogenation itself. The first limitation is necessary in view of the fact that our novel pyranthrone-halogen addition-compounds are unstable in the presence of moisture. The second limitation has as its object clearly to avoid waste of halogenating agent. As specific examples of suitable solvents or suspending media may be mentioned nitrobenzene, dichlorobenzene, trichlorobenzene and tetrachlorethane.

As halogenating agent, any one capable of working in anhydrous solution may be used, but preferably it should not be a powerful oxidizing agent. Bromine, hydrobromic acid, sulfur monobromide and sulfuryl chloride are specific halogenating agents used by us with great success.

If desired, well recognized halogen carriers or catalysts, such as iodine, may be added to speed up the reaction. These are to be distinguished from the special catalyzers mentioned in this specification. The effect of iodine is to accelerate or speed up the reaction. The effect of aniline, phenol, sulfur dioxide, or the other catalyzers mentioned herein is more of a directing or orienting nature. They determine the course of the reaction and the nature of the final product. For specific distinction, where necessary hereinafter, we shall refer to the iodine type catalyst as a "speed catalyst" and to the aniline type as a "directing catalyst".

Without limiting our invention to any particular procedure, the following examples, in which parts by weight are given, will serve to illustrate our preferred mode of operation.

Example 1

40 parts of dry, amorphous pyranthrone are suspended in 600 parts of nitrobenzene containing 1 part of aniline hydrochloride. 35 parts of bromine are then added and the mass is stirred at 55–60° C. for about 18 hours. At this point the formation of the intermediate addition product is substantially complete. The originally orange mass turns black, and when a sample is viewed under a microscope it appears to consist of dark violet needles having a green fluorescence.

The mass is now cooled to 20° C.; 60 parts of sulfuryl chloride are added; and the mass is stirred at 20–22° for about 24 hours. The temperature is now raised to 65° C.; held at this value for 3 hours; raised further to 115–116° C., and maintained at this point for another 3 hours. During the latter stage the mass changes color again and becomes red. The mass is then cooled to room temperature and filtered; the filter cake is washed successively with nitrobenzol and alcohol and dried.

The product thus obtained analyzes 23.2% Br and 3.6% Cl, and is very probably a mixture of dibromo-pyranthrone and monobromo-monochloro-phyranthrone. When dry it is a scarlet powder, soluble in concentrated sulfuric acid with a reddish blue color, and in hot nitrobenzene with an orange color. It can be used directly as a vat dyestuff, and dyes cotton from a red-violet vat in bright orange to scarlet shades. When condensed with alpha-amino-anthraquinone it gives a vat dyestuff dyeing cotton from a violet vat in very strong and fast olive-green shades.

Example 2

40 parts of dry, amorphous pyranthrone are suspended in 600 parts of nitrobenzene, and 1 part of aniline hydrochloride plus 0.4 part of iodine are added. 35 parts of bromine are then introduced; the mass is heated to 55–60° C., and stirred at this temperature for 18 hours. A black intermediate addition-compound is formed, which appears to be substantially the same as in Example 1.

Example 3

40 parts of dry, amorphous pyranthrone are suspended in 600 parts of nitrobenzene containing 1 part of aniline hydrochloride. A mixture of 35 parts of bromine and 30 parts of thionyl chloride is added and the mass is stirred at 20–22° C. for about 90 hours. The originally orange mass has by this time turned dark. To insure complete reaction, the temperature is raised to 80° C.; maintained at this value for 3 hours; further raised to 115° C., and kept at this point for another 3 hours. During the latter stage the mass brightens up again and turns orange-brown. The mass is now cooled, and the product filtered off, washed and dried.

The dry product is an orange-brown powder, dissolving in concentrated sulfuric acid with a reddish-blue color. It may be used directly as a vat dyestuff, and dyes cotton from a violet vat in orange shades. When condensed with alpha-amino-anthraquinone it gives a vat dyestuff dyeing cotton from a violet vat in khaki shades, of good tinctorial strength and excellent fastness qualities.

The product of this example analyzes 12.5% Br and 1.8% Cl, and is very probably a novel monobromo-pyranthrone.

In this example the formation of the intermediate addition product and its oxidation by the thionyl chloride have been made to run to a certain extent concurrently. This condition, however, is not absolutely necessary, for it is possible to proceed first with the preparation of a distinct intermediate addition-product as in Example 1, and then to react upon the mass with thionyl chloride to produce the novel monobromo-pyranthrone body.

Example 4

40 parts of dry, amorphous pyranthrone are suspended in 600 parts of nitrobenzene. 1 part of aniline hydrochloride and 0.4 parts of iodine are added. 60 parts of sulfuryl chloride are then introduced, and the mass is stirred at 22–23° C. for 24 hours. A black intermediate addition-compound is formed, resembling in properties that of Example 1.

Example 5

40 parts of dry, amorphous phyranthrone are suspended in 600 parts of nitrobenzene, and 1 part of aniline hydrochloride plus 0.4 parts of iodine are added. A stream of hydrobromic acid gas, as obtained by reacting with sulfuric acid upon sodium bromide, is now passed in, until 36 parts have been absorbed. The mass is stirred at room temperature for 20 hours. The initially orange mass turns black, indicating the formation of the intermediate complex addition-compound. The latter, when examined, appears similar to the addition-compound obtained in Example 1.

Example 6

40 parts of dry, amorphous pyranthrone are suspended in 600 parts of nitrobenzene and 1 part of aniline hydrochloride plus 0.4 parts of iodine are added. 60 parts of sulfuryl chloride are now added, the mass is heated to 55–60° C., and stirred at this temperature for 18 hours. A black intermediate addition-compound is formed which appears to be substantially identical with or very similar to the product obtained in Example 4.

Example 7

The procedure is the same as in the first paragraph of Example 1, except that in lieu of aniline hydrochloride, aniline base is employed. The intermediate addition-compound formed appears to be identical with that of Example 1.

Example 8

The procedure is the same as in Example 2, except that in lieu of 1 part of aniline hydrochloride, 1 part of phenol is used. The black intermediate addition-compound obtained appears to be identical with that of Example 2.

Example 9

40 parts of dry, amorphous pyranthrone are suspended in 600 parts of nitrobenzene. A stream of sulfur dioxide, as obtained by reacting with sulfuric acid upon sodium bisulfite, is slowly passed into the mass until no longer absorbed by the nitrobenzene. 35 parts of bromine are now added; the mass is heated to about 55–60° C. and stirred at this temperature for several hours. An intermediate black compound is formed which appears to be identical with that obtained in Example 1.

General

If in any of the above examples, the aniline hydrochloride is replaced by any of the catalyzers mentioned above, such as o-, m-, or p-toluidine; alpha- or beta-naphthylamine, the hydrochloride or other salt of any of these; phenol, cresol, naphthol, hexalin or salts of these such as the alkali-metal salts; toluene, solvent naphtha, acetone, or mixtures of any two or more of these, the results obtained are the same.

It will be understood that our invention is not limited to the precise procedure above set forth. Thus, although we have preferred to use the same quantities of pyranthrone and bromine or pyranthrone and sulfuryl chloride in each example, for the sake of facilitating comparative study, the proportions may be varied within wide limits. The natural lower limit, for complete conversion of the pyranthrone, is two mols of the halogenating agent per mol of pyranthrone. An excess of halogenating agent, however, does no harm and is indeed beneficial. Best results are obtained by using 4 to 5 mols of halogenating agent per mol of pyranthrone. Similarly, the temperature of the reaction may be varied considerably. 20 to 60° C. makes an ideal working range.

Many other variations and modifications are possible in our preferred mode of procedure, without departing from the spirit of this invention, as defined by the subjoined claims.

In the claims below it should be understood that by the terms "a catalytic proportion", we are referring to a small quantity of the substance being discussed, far below stoichiometric as compared to the quantity of pyranthrone being halogenated, and being of the order of magnitude in which catalysts are generally employed, which, as is well known, generally ranges from a trace to a few percent by weight of the substance being catalyzed.

We claim:

1. The process of producing a pyranthrone-halogen addition-compound which comprises reacting with a halogenating agent upon pyranthrone in the presence of a catalytic proportion of a mild, anhydrous reducing agent.

2. The process of producing a pyranthrone-halogen addition-compound which comprises reacting with a halogenating agent upon pyranthrone in the presence of a nascent anhydrous reducing agent.

3. The process of producing a pyranthrone-halogen addition-compound which comprises reacting with a halogenating agent upon pyranthrone in the presence of an organic compound which is readily susceptible to halogenation.

4. The process of producing a pyranthrone-halogen addition-compound which comprises reacting with sulfuryl chloride upon pyranthrone in the presence of sulfur dioxide.

5. The process of producing a pyranthrone-halogen addition-compound which comprises reacting with sulfuryl chloride upon pyranthrone in the presence of an organic compound which is readily susceptible to chlorination by means of sulfuryl chloride.

6. The process of producing a pyranthrone-bromine addition-compound, which comprises reacting with bromine upon pyranthrone in the presence of an initial quantity of hydrobromic acid.

7. The process of producing a pyranthrone-bromine addition-compound, which comprises reacting with bromine upon pyranthrone in the presence of an organic compound which is readily susceptible to bromination.

8. The process of producing a pyranthrone-halogen addition-compound which comprises reacting with a halogenating agent upon pyranthrone in the presence of a directing catalyst and a speed catalyst.

9. The process of producing a pyranthrone-halogen addition-compound which comprises reacting with a halogenating agent upon pyranthrone in the presence of a catalytic proportion of a mild anhydrous reducing agent and a speed catalyst.

10. The process of producing a pyranthrone-halogen addition-compound which comprises reacting with a halogenating agent upon pyranthrone in the presence of an organic compound which is readily susceptible to halogenation and in the presence of a speed catalyst.

11. The process of producing a pyranthrone-halogen addition-compound which comprises reacting with a halogenating agent upon pyranthrone in an anhydrous organic liquid medium and in the presence of a readily hydrogenable organic compound selected from the group consisting of aromatic amines, hydrocarbons, phenols, cyclic alcohols, aliphatic ketones, and salts of any of these.

12. A process as in claim 11, said halogenating agent being selected from the group consisting of bromide, hydrobromic acid, and sulfuryl chloride.

13. The process of producing a pyranthrone-halogen addition-compound which comprises reacting with a halogenating agent upon pyranthrone in an anhydrous organic liquid medium and in the presence of a catalytic proportion of sulfur dioxide.

14. A process as in claim 13, said halogenating agent being selected from the group consisting of bromine and sulfuryl chloride.

15. The process of producing a pyranthrone-halogen addition-compound which comprises reacting with a halogenating agent upon pyranthrone in an anhydrous organic liquid medium and in the presence of a compound selected from the group consisting of phenol, cresol, hexalin, alpha-naphthol, and salts of these.

16. A process as in claim 15, said halogenating agent being selected from the group consisting of sulfuryl chloride and bromine.

17. The process of producing a pyranthrone-halogen addition-compound which comprises reacting with a halogenating agent upon pyranthrone in the presence of nascent hydrobromic acid.

18. The process of producing a pyranthrone-bromine addition-compound which comprises reacting with bromine upon pyranthrone in the presence of nascent hydrobromic acid.

19. The process of producing a pyranthrone-halogen addition-compound which comprises reacting with a halogenating agent upon pyranthrone in the presence of nascent sulfur dioxide.

20. A process for producing a pyranthrone-sulfuryl chloride addition-compound which comprises reacting 1 mol of pyranthrone with 4 to 5 mols of sulfuryl chloride in an inert organic medium and at a temperature between 20 and 60° C. in the presence of sulfur dioxide.

21. A process for producing a pyranthrone-sulfuryl chloride addition-compound which comprises reacting 1 mol of pyranthrone with 4 to 5 mols of sulfuryl chloride in an inert organic medium and at a temperature between 20 and 60° C. in the presence of sulfur dioxide in nascent state.

22. A process for producing a pyranthrone-bromine addition-compound which comprises reacting 1 mol of pyranthrone with 4 to 5 mols of bromine in an inert organic medium and a temperature of 20 to 60° C. in the presence of a catalytic proportion of sulfur dioxide.

23. A process for producing a pyranthrone-bromine addition-compound which comprises reacting 1 mol of pyranthrone with 4 to 5 mols of bromine in an inert organic medium and a temperature of 20 to 60° C. in the presence of nascent hydrobromic acid.

24. The process which comprises reacting with a halogenating agent upon a suspension of pyranthrone in nitrobenzene containing further a catalytic quantity of a readily halogenable organic compound, until the initially orange colored pyranthrone has been substantially completely converted into a black body which under the microscope presents the appearance of dark violet needles having a green fluorescence.

JOSEPH DEINET.
DAVID KATZ.